United States Patent
Tanaami et al.

(10) Patent No.: US 12,444,290 B2
(45) Date of Patent: Oct. 14, 2025

(54) GARMENT AND NOTIFICATION SYSTEM

(71) Applicant: SINTOKOGIO, LTD., Nagoya (JP)

(72) Inventors: Yoshikane Tanaami, Nagoya (JP); Miyuki Hayashi, Nagoya (JP); Yukie Maeno, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 18/740,755

(22) Filed: Jun. 12, 2024

(65) Prior Publication Data
US 2025/0006032 A1   Jan. 2, 2025

(30) Foreign Application Priority Data
Jun. 30, 2023 (JP) ................... 2023-108647

(51) Int. Cl.
  *G08B 21/18* (2006.01)
  *A41D 1/00* (2018.01)
  *G06F 3/044* (2006.01)

(52) U.S. Cl.
  CPC .......... *G08B 21/18* (2013.01); *A41D 1/005* (2013.01); *G06F 3/044* (2013.01)

(58) Field of Classification Search
  None
  See application file for complete search history.

(56) References Cited

U.S. PATENT DOCUMENTS

| | | |
|---|---|---|
| 2013/0192071 A1 | 8/2013 | Esposito et al. |
| 2018/0376586 A1* | 12/2018 | Longinotti-Buitoni ...... A61B 5/6805 |
| 2019/0208837 A1* | 7/2019 | Poupyrev ............ A41D 1/005 |
| 2022/0011933 A1* | 1/2022 | Wu .............. G06F 3/04883 |

FOREIGN PATENT DOCUMENTS

| | | |
|---|---|---|
| JP | 2015-509028 A | 3/2015 |
| JP | 2016-71554 A | 5/2016 |

* cited by examiner

*Primary Examiner* — Stephen T. Reed
(74) *Attorney, Agent, or Firm* — Harness, Dickey & Pierce, P.L.C.

(57) ABSTRACT

Reduced is, when a user performs an input operation, restriction of an action of the user other than the operation. A garment includes: a contact sensor which has fibrous electric conductors and which detects an input operation performed by a user; a transmitting section that transmits information indicative of the input operation to a management device; and a notification section that executes notification according to an instruction from the management device.

6 Claims, 4 Drawing Sheets

GARMENT AND NOTIFICATION SYSTEM

This Nonprovisional application claims priority under 35 U.S.C. § 119 on Patent Application No. 2023-108647 filed in Japan on Jun. 30, 2023, the entire contents of which are hereby incorporated by reference.

TECHNICAL FIELD

The present invention relates to, for example, a garment for communicating with an external machine.

BACKGROUND ART

Technologies in which user terminals and external machines communicate with each other have been known as conventional technologies. For example, Patent Literature 1 discloses a tablet terminal. Specifically, a field worker drags a name tag of the field worker displayed on a pre-entry area among four areas displayed on a display section of the tablet terminal, into any of an entry area, a rest area, and an exit area. The name tag of the field operator is caused to be displayed with use of a list invoking button or an ID input key. When the dragging operation for the name tag is completed, the CPU of the tablet terminal associates data on the field worker, data on the condition that has changed, and data on time and transmits them to a management server.

CITATION LIST

Patent Literature

[Patent Literature 1]
Japanese Patent Application Publication, Tokukai, No. 2016-71554

SUMMARY OF INVENTION

Technical Problem

However, such a conventional technology is not achieved in terms of reducing restriction of an action of a user other than an operation for the tablet terminal when the user uses the tablet terminal.

It is an object of an aspect of the present disclosure to achieve, for example, a garment that makes it possible to communicate with an external machine without a user holding a machine to operate the machine.

Solution to Problem

In order to solve the foregoing problem, a garment in accordance with an aspect of the present disclosure includes: a mutual capacitive contact sensor which has fibrous electric conductors and which detects an input operation performed by a user, the mutual capacitive contact sensor being attachable to the garment or being formable integrally with the garment; a transmitting section that transmits, to an external machine, information that is indicative of the input operation which has been detected by the mutual capacitive contact sensor; a receiving section that receives an instruction from the external machine or another external machine; and a notification section that executes notification according to the instruction which has been received by the receiving section.

Advantageous Effects of Invention

An aspect of the present disclosure enables a user to, when the user performs an input operation, perform the input operation without holding a machine to operate the machine.

DESCRIPTION OF EMBODIMENTS

Embodiment

The following will discuss an embodiment of the present disclosure in detail with reference to FIGS. 1 to 5.

Outline of Notification System 1

Figure 1:
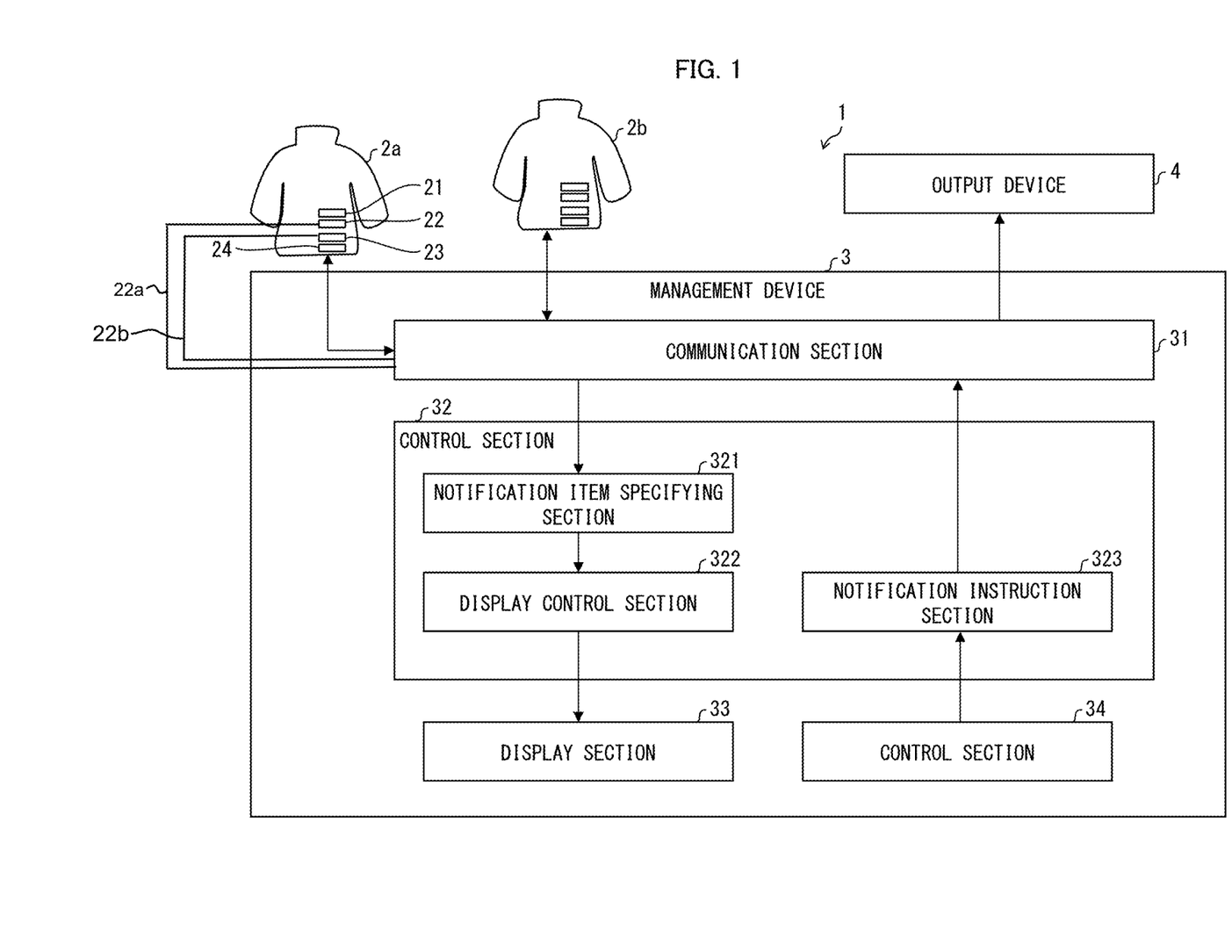
FIG. 1 is a block diagram illustrating main parts of an example of a notification system in accordance with an embodiment of the present disclosure.

First, an outline of the present embodiment will be described with reference to FIG. 1. FIG. 1 is a block diagram illustrating main parts of an example of a notification system 1. As illustrated in FIG. 1, the notification system 1 includes a garment 2a to be worn by a user, a garment 2b to be worn by another user, a management device 3, and an output device 4.

Figure 2:
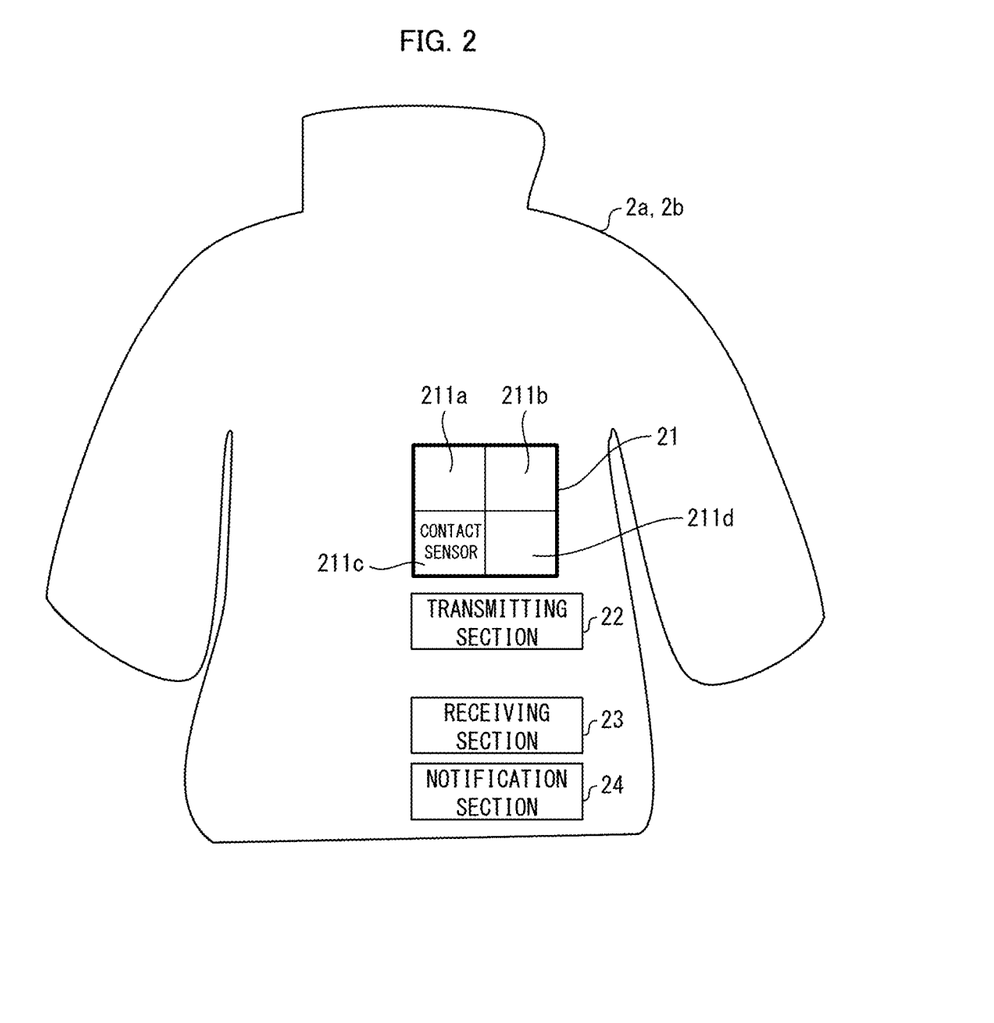
FIG. 2 is a view illustrating an example of main parts of a garment in accordance with an embodiment of the present disclosure.

FIG. 2 is a view illustrating an example of main parts of each of the garment 2a and the garment 2b. As illustrated in FIG. 2, each of the garment 2a and the garment 2b includes a contact sensor 21 and a transmitting section 22. The contact sensor 21 detects an input operation performed by the user. The transmitting section 22 transmits information indicative of the input operation which has been detected by the contact sensor 21, to the management device 3. In other words, the management device 3 receives information indicative of an input operation which has been transmitted by each of the garment 2a and the garment 2b.

In addition, each of the garment 2a and the garment 2b includes a receiving section 23 and a notification section 24. The receiving section 23 receives an instruction from the management device 3. The notification section 24 executes notification according to the instruction. In other words, the management device 3 instructs that the notification section 24 included in each of the garment 2a and the garment 2b execute notification.

In the above configurations, the garment 2a and the garment 2b each include the contact sensor 21 configured to detect an input operation. This makes it possible to communicate with an external machine without the user holding a machine to operate the machine. That is, it is possible to, when a user performs an input operation, reduce restriction of an action of the user other than the input operation, as compared with information terminals configured to be held by the users by hands.

In addition, each of the garment 2a and the garment 2b includes the notification section 24 configured to execute notification according to the instruction which has been received from the management device 3. This makes it possible to communicate with an external machine without the user holding a machine. That is, it is possible to, when a user receives notification from the management device 3, reduce restriction of an action of the user, as compared with information terminals configured to be held by the users by hands.

That is, the notification system 1 makes it possible to communicate with an external machine without the user holding a machine to operate the machine. That is, when the user uses the notification system 1, it is possible to reduce restriction of an action of the user other than the use of the system.

The users may be, for example, workers who work at manufacturing lines of factories. In such a case, when the user communicates with the management device 3, it is possible to reduce restriction of an action of the user at, for example, the manufacturing line. That is, the user can communicate with the management device 3 while incurring as little restriction of work at the manufacturing line as possible.

Further, each of the garment 2a and the garment 2b is provided with the contact sensor 21 and thus makes it possible to reduce, for example, a risk that the user forgets to wear a terminal device, as compared with wearable devices, such as wristwatches.

Furthermore, the garments 2 are provided with the contact sensors 21 and the notification sections 24 and thus make it possible to improve flexibility in positioning of the contact sensors 21 and the notification sections 24, compared with, for example, small wearable devices.

Notification System 1

As described above, the notification system 1 includes the garment 2a, the garment 2b, the management device 3, and the output device 4. FIG. 1 illustrates an example in which the notification system 1 includes the plurality of garments: the garment 2a and the garment 2b. As other examples of the notification system 1, the notification system 1 may include any number of garments 2 or may include a single garment 2.

In addition, the present embodiment describes an example in which the same management device 3 serves as both of a destination of information indicative of input operations transmitted by the garment 2a and the garment 2b and a sender of instructions to be received by the garment 2b and the garment 2a.

As another example, different machines may serve as a destination of information indicative of input operations transmitted by the garment 2a and the garment 2b and a sender of instructions to be received by the garment 2a and the garment 2b.

Garments 2

As illustrated in FIG. 2, each of the garment 2a and the garment 2b includes the contact sensor 21, the transmitting section 22, the receiving section 23, and the notification section 24. In addition, the garment 2a and the garment 2b have, as illustrated in FIG. 2, the same configuration and thus are referred to collectively as "garment(s) 2".

Contact Sensor 21

The contact sensor 21 detects an input operation performed through contact by the user. The contact sensor 21 is a mutual capacitive contact sensor having a fibrous electric conductor. The contact sensor 21 is attachable to the garment 2 or is formable integrally with the garment 2.

Specifically, the contact sensor 21 may have a contact surface with which the user of the garment 2 can make a direct or indirect contact. The user of the garment 2 can operate the contact sensor 21, for example, by making a direct contact with the contact surface with a fingertip. The user of the garment 2 may alternatively operate the contact sensor 21 by making an indirect contact with the contact surface via an item. When a person makes contact with the contact surface, a capacitance at an area on the contact surface with which the person has made contact is changed. The contact sensor 21 can detect the change in a capacitance, and thus contact of a person with the contact surface of the contact sensor 21 and the contact area.

For example, a first fibrous electric conductor for generating an electric field and a second fibrous electric conductor for absorbing an electric field are woven into the garment to be worn by a user (for example, through needlework) in a lattice pattern, so that the contact sensor 21 can be formed integrally with the garment 2. Alternatively, the contact sensor 21 may be attached to the garment 2. That is, it is possible to attach a finished contact sensor 21 to the garment 2. The contact sensor 21 may be configured in a form of, for example, a patch or a seal and be attached to the garment 2.

The contact sensor 21 may be formed integrally with the garment 2 to be worn by the user of the garment 2, in particular, the left sleeve and/or the right sleeve or may be attached to the left sleeve and/or the right sleeve of the garment 2. It is possible that in a case where the user of the garment 2 is right-handed, the contact sensor 21 is located at the left sleeve of the garment 2, whereas in a case where the user of the garment 2 is left-handed, the contact sensor 21 is located at the right sleeve of the garment 2. This enables the user of the garment 2 to operate the contact sensor 21 with a dominant hand. It is possible that two contact sensors 21 are located at the respective right and left sleeves of the garment 2. This configuration allows both a right-handed user and a left-handed user to easily operate the contact sensor 21 with the dominant hand.

The contact sensor 21 may include, for example, a voltage generation section for applying a voltage to an electrode of the contact sensor 21 and a capacitive detection section for detecting a capacitance of the contact sensor 21.

In addition, as illustrated in FIG. 2, the contact sensor 21 may include a plurality of units 211a, 211b, 211c, and 211d for detecting input operations by the user. In a configuration in which the contact sensor 21 includes the plurality of units 211a to 211d, it is possible that each of the units 211a to 211d is configured to detect the input operation. The present embodiment will describe an example in which the contact sensor 21 includes the four units, but the number of units included in the contact sensor 21 can be set as appropriate. Further, between the respective units 211a to 211d, a predetermined interval may be provided. For example, the information indicative of an input operation which is transmitted from the garment 2 to the management device 3 may include information specifying a unit that has detected the input operation, among the units 211a to the 211d.

A predetermined interval being provided between the respective units 211a to 211d enables the user to, when performing an input operation for each of the units 211a to 211d, perform the input operation with large motion. Specifically, because the target of the input operation is large, the user can perform the input operation for the contact sensor 21 with large motion, as compared with input operations for wearable devices, such as wristwatches.

In addition, input operations for the respective units 211a to 211d may correspond to predetermined notification items. The predetermined notification items corresponding to the input operations for the respective units 211a to 211d can be set as appropriate.

For example, the input operation for the unit 211a may be an input operation indicating, as the notification item, that the user is requesting to exit a manufacturing line. The input operation for the unit 211b may be an input operation indicating, as the notification item, presence of a malfunction in the manufacturing line. The input operation for the unit 211c may be an input operation indicating, as the notification item, that the lot of articles has changed at the manufacturing line. The input operation for the unit 211d may be an input operation indicating, as the notification item, start of work by the user.

Transmitting Section 22

The transmitting section 22 transmits information indicative of an input operation which has been detected by the contact sensor 21, to the management device 3, which is an external machine. The transmitting section 22 may perform wired communication via wire 22a or wireless communication with the management device 3.

The transmitting section 22 may transmit, to the management device 3, identification information for identifying the contact sensor 21 and unit information for specifying a unit that has detected an input operation.

Receiving Section 23

The receiving section 23 receives an instruction related to execution of notification by the notification section 24 from the management device 3, which is an external machine. The receiving section 23 may perform wired communication via wire 22b or wireless communication with the management device 3.

Notification Section 24

The notification section 24 performs notification according to an instruction which the receiving section 23 has received from the management device 3. Specifically, the notification section 24 performs notification on the basis of a notification pattern specified by the instruction received by the receiving section 23.

For example, the notification section 24 may include a mechanism configured to emit light, may be a speaker configured to output a notification sound, or may be a vibrator configured to vibrate. The notification section 24 is not particularly limited, provided that the notification section 24 is configured to execute notification which enables the user to recognize the notification. In a case where the notification section 24 includes a mechanism configured to emit light, the above notification pattern may be a cycle of light flashes. In such a configuration, a plurality of cycles of light flashes may correspond to predetermined notification items. For example, a certain cycle of light flashes may indicate, for example, a notification item which instructs that the user of the garment 2 join a manufacturing line. Alternatively, in a case where the notification section 24 is a speaker, the above notification pattern may be, for example, the type of a notification sound. In such a configuration, the plurality of types of notification sounds may correspond to predetermined notification items. Still alternatively, in a case where the notification section 24 is a vibrator, the above notification pattern may be a cycle of vibration or an intensity of vibration. In such a configuration, a plurality of cycles of vibration or a plurality of intensities of vibration may correspond to predetermined notification items.

According to the above configurations, when the user recognizes a notification pattern of the notification section 24, the user can recognize that the user has been notified of a notification item corresponding to the notification pattern, among a plurality of notification items.

Further, each of the garments 2 may include a plurality of notification sections 24. The instruction which the receiving section 23 receives from the management 3 may include device information specifying a notification section 24 that executes notification among the plurality of notification sections 24. According to the above configuration, by recognizing which notification section 24 has executed the notification, the user can recognize that the user has been notified of a notification item corresponding to the notification section 24, among a plurality of notification items.

Further, in a case where each of the garments 2 includes a single notification section 24, a plurality of notification patterns corresponding to a plurality of predetermined notification items may be set. In contrast, in a case where each of the garments 2 includes a plurality of notification sections 24, the plurality of notification patterns corresponding to a plurality of predetermined notification items may not be set.

Management Device 3

As illustrated in FIG. 1, the management device 3 includes a communication section 31, a control section 32, a display section 33, and an operation section 34. The management device 3 may not include all of the communication section 31, the control section 32, the display section 33, and the operation section 34, and the configuration of the management device 3 can be set as appropriate.

Communication Section 31

The communication section 31 communicates with the garments 2. In addition, the communication section 31 communicates with the output device 4. The communication may be performed in a wireless or wired manner.

Control Section 32

The control section 32 collectively controls the components of the management device 3. The control section 32 includes a notification item specifying section 321, a display control section 322, and a notification instruction section 323.

Notification Item Specifying Section 321

The notification item specifying section 321 acquires information indicative of an input operation from each of the garment 2a and the garment 2b via the communication section 31.

As described above, the information indicative of an input operation may include identification information for identifying the contact sensor 21. The identification information for identifying the contact sensor 21 may be information for identifying the garment 2a or garment 2b which has accepted an input operation, from among the plurality of garments 2a and 2b. Alternatively, the identification information may be information identifying a user of the garment 2a or garment 2b which has accepted an input operation. That is, the identification information may be information for identifying a user who has performed an input operation via the garment 2a or 2b. For example, the management device 3 may include data indicative of a correspondence relationship between the identification information and each of the users. The notification item specifying section 321 may refer to the identification information to specify a user who has performed an input operation.

Further, as described above, the information indicative of an input operation may include the unit information specifying a unit which has detected an input operation, from among the plurality of units included in the contact sensor 21. The correspondence between the units 211 included in the contact sensor 21 and predetermined notification items is described in the above <Contact Sensor 21> section, and thus the description thereof is omitted here. For example, the management device 3 may include data indicative of a correspondence relationship between input operations for the respective units 211a to 211d and notification items. The notification item specifying section 321 may refer to the unit information to specify a notification item which has been inputted by the user of the garment 2a or 2b, from among a plurality of predetermined notification items.

Display Control Section 322

The display control section 322 causes the display section 33 to display the user having performed an input operation who has been specified by the notification item specifying section 321 and the notification item which has been specified by the notification item specifying section 321.

Notification Instruction Section 323

The notification instruction section 323 transmits, to the garment 2a or the garment 2b, an instruction for execution of notification by the notification section 24 in accordance with an input from the user which has been accepted by the operation section 34 described later, via the communication section 31.

The notification instruction section 323 may determine a notification pattern of the notification section 24 which corresponds to a notification item that has been inputted d from the operation section 34 and transmit, to the garment 2a or the garment 2b, an instruction for executing notification with the determined notification pattern.

For example, predetermined notification items and predetermined notification patterns of the notification section 24 may be associated with each other in advance. The management device 3 may include data indicative of a correspondence relationship between notification items and notification patterns.

In a case where the garment 2a or garment 2b to which the instruction is to be transmitted includes the plurality of notification sections 24, the notification instruction section 323 may determine the notification section 24 corresponding to the notification item which has been inputted from the operation section 34. The notification instruction section 323 may transmit, to the garment 2a or garment 2b, an instruction for execution of notification by the determined notification section 24. For example, predetermined notification items and predetermined notification sections 24 may be associated with each other in advance. The management device 3 may include data indicative of a correspondence relationship between the notification items and the notification sections 24.

Further, the notification instruction section 323 may transmit an instruction for execution of an operation to the output device 4 via the communication section 31, in accordance with an input from the user which has been accepted by the operation section 34.

Display Section 33

The display section 33 displays the user who has been performed an input operation through the garment 2a or the garment 2b and the notification item which has been inputted by the user, in accordance with the instruction from the display control section 322. Examples of the display section 33 include displays and monitors.

Figure 3:
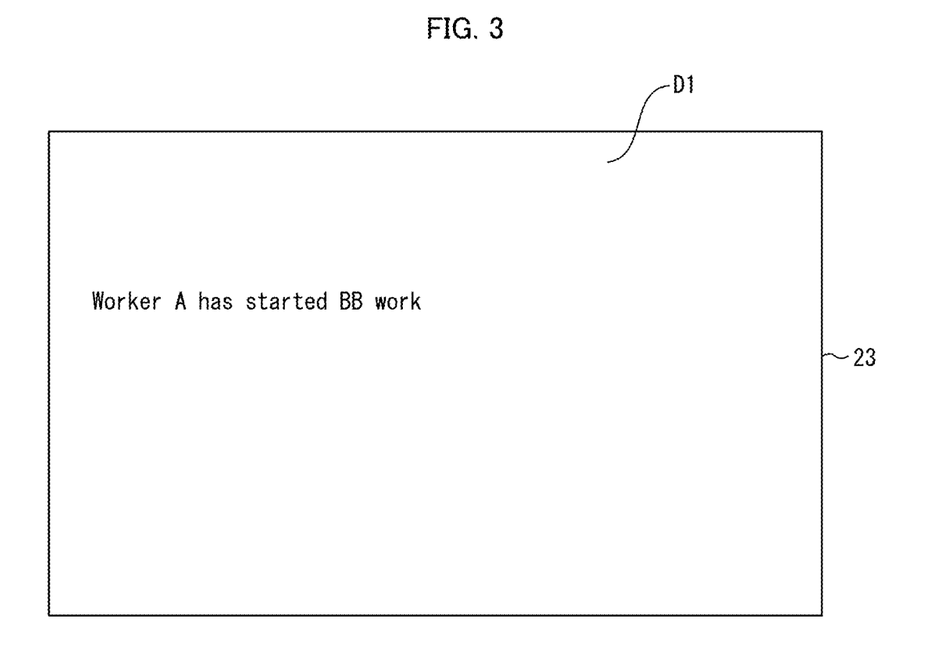
FIG. 3 is a view illustrating an example of a display image displayed by a management device in accordance with an embodiment of the present disclosure.

FIG. 3 is a view illustrating an example of a display image displayed by the display section 33. As illustrated in FIG. 3, a display image D1 is displaying a message stating, "Worker A has started BB work". Here, the "worker A" corresponds to the user of the garment 2a or the garment 2b who has performed an input operation. The expression "has started BB work" corresponds to a notification item which has been notified through the input operation by the user of the garment 2a or the garment 2b.

Operation Section 34

The operation section 34 accepts an input operation performed by the user of the management device 3. The input operation is related to the instruction for execution of notification to be performed by the notification section 24 of the garment 2a or the notification section 24 of the garment 2b. The operation section 34 may accept an input operation related to selection of a target to which an instruction is to be transmitted from among the garment 2a and the garment 2b. Further, the operation section 34 may accept selection of a notification item to be transmitted to the target to which the instruction is to be transmitted.

Further, the operation section 34 may accept selection of a notification pattern to be executed by the notification section 24 included in the target to which the instruction is to be transmitted. The operation section 34 may accept selection of a notification section 24 caused to perform notification from among the plurality of notification sections 24 included in the target to which the instruction is to be transmitted.

Furthermore, the operation section 34 may accept an instruction for execution of an operation to be performed by the output device 4.

Output Device 4

The output device 4 receives an instruction transmitted from the management device 3 and executes an operation in accordance with the instruction. Examples of the output device 4 include a beacon light configured to light and rotate a warning lump and a security alarm configured to output an alarm sound.

Example of Flow of Notification Process from Garment 2a or Garment 2b to Management Device 3 in Notification System 1

Figure 4:
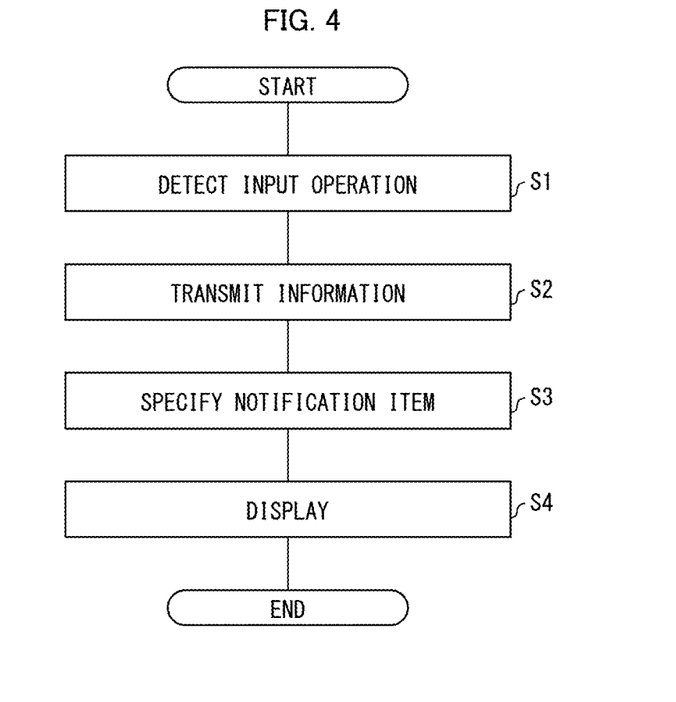
FIG. 4 is a flowchart illustrating an example of a flow of a notification process in a notification system in accordance with an embodiment of the present disclosure.

FIG. 4 is a flowchart illustrating an example of a flow of a notification process from the garment 2a or 2b to the management device 3 in the notification system 1. As illustrated in FIG. 4, the contact sensor 21 detects an input operation performed through contact by the user of the garment 2a or the garment 2b (S1). Subsequently, the transmitting section 22 transmits, to the management device 3, information indicative of the input operation which has been detected by the contact sensor 21 (S2). The notification item specifying section 321 of the management device 3 then specifies a user who has performed the input operation and a notification item which has been inputted by the user (S3). After that, the display section 33 displays the user and the notification item which have been specified by the notification item specifying section 321 (S4).

The following will describe an example of applications of the above-described flow of the process of the notification system 1.

For example, a worker A, who is the user of the garment 2a, performs, for the corresponding unit 211a of the contact sensor 21, an input operation indicating, as the notification item, a request to exit the manufacturing line. The contact sensor 21 of the garment 2a detects the input operation (S1). The transmitting section 22 transmits information indicative of the input operation to the management device 3 (S2). The notification item specifying section 321 of the management device 3 then specifies the worker A, who is the user having performed the input operation and a "request to exit from manufacturing line", which is a notification item (S3). Subsequently, the display section 33 displays a message stating, for example, "Worker A is requesting exit" (S4).

Example of Flow of Notification Process from Management device 3 to Garment 2a or Garment 2b in Notification System 1

Figure 5:
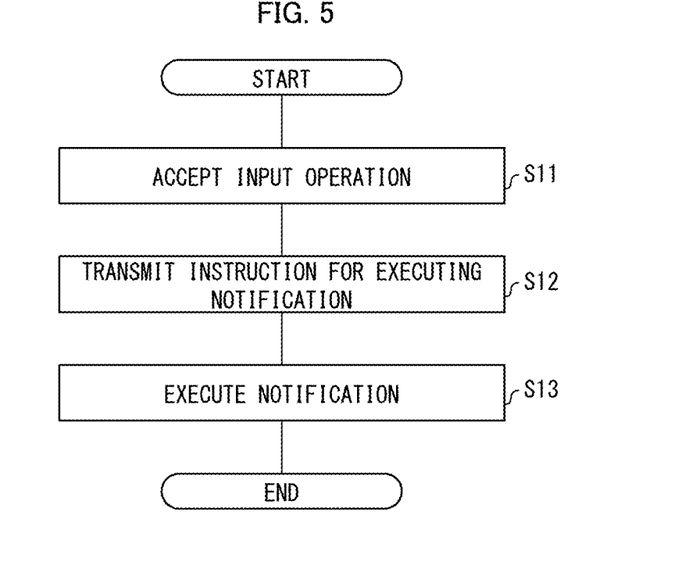
FIG. 5 is a flowchart illustrating another example of the flow of the notification process in the notification system in accordance with the embodiment of the present disclosure.

FIG. 5 is a flowchart illustrating an example of a flow of a notification process from the management device 3 to the garment 2a or the garment 2b in the notification system 1. As illustrated in FIG. 5, the operation section 34 accepts an input operation performed by the user of the management device 3 (S11). The notification instruction section 323 then transmits, to the garment 2a or the garment 2b, an instruction for executing notification corresponding to the input from the operation section 34 performed by the user (S12). Subsequently, the notification section 24 of the garment 2a or the garment 2b performs the notification (S13).

The following will describe an example of applications of the above-described flow of the process of the notification system 1.

It is assumed that, for example, the display section 33 of the management device 3 is displaying a message stating, for example, "Worker A is requesting exit."

The operation section 34 accepts an input operation which has been performed by the user of the management device 3 and which notifies a worker B who is the user of the garment 2b of joining the manufacturing line (S11). Subsequently, the notification instruction section 323 transmits, to the garment 2b, an instruction which instructs that notification section 24 execute a notification pattern corresponding to "joining the manufacturing line", which is a notification item (S12). The notification section 24 of the garment 2b then executes notification in accordance with the instruction which has been received (S13). For example, in order to indicate the manufacturing line that the worker B is to join, the user of the management device 3 may perform, for the operation section 34, an input operation for execution of an operation of the beacon light provided to the manufacturing line in which the worker A requesting exit is working.

Variation

In the above-described example, it is described that the management device 3 accepts an input operation performed by the user of the management device 3 to transmit an instruction for execution of an operation to be performed by the notification section 24 of the garment 2a, the notification section 24 of the garment 2b, or the output device 4.

As another example, the management device 3 may transmit, to the garment 2a or the garment 2b, an instruction for execution of notification to be performed by the notification section 24, on the basis of information indicative of an input operation received from the garment 2a or the garment 2a, without accepting an input operation performed by the user of the management device 3.

For example, in a case where the management device 3 receives notification of a request to exit a manufacturing line from the garment 2a, the management device 3 may transmit, to the garment 2b, an instruction which instructs that the notification section 24 execute notification corresponding to "joining the manufacturing line", which is a notification item, without accepting an input operation performed by the user. Further, in order to indicate a manufacturing line which the user of the garment 2b is to join, the management device 3 may transmit an instruction for execution of an operation to the beacon light provided to the manufacturing line in which the user of the garment 2a is working, without accepting the input operation performed by the user.

Recap

A garment in accordance with Aspect 1 includes: a mutual capacitive contact sensor which has fibrous electric conductors and which detects an input operation performed by a user, the mutual capacitive contact sensor being attachable to the garment or being formable integrally with the garment; a transmitting section that transmits, to an external machine, information that is indicative of the input operation which has been detected by the mutual capacitive contact sensor; a receiving section that receives an instruction from the external machine or another external machine; and a notification section that executes notification according to the instruction which has been received by the receiving section.

The garment in accordance with Aspect 1 is provided with the contact sensor configured to detect an input operation. This makes it possible to communicate with an external machine without the user holding a machine to operate the machine. That is, it is possible to, when a user performs an input operation, reduce restriction of an action of the user other than the input operation, as compared with information terminals configured to be held by the users by hands. Further, the garment includes the notification section configured to execute notification according to the instruction which has been received from the external machine. This makes it possible to communicate with an external machine without the user holding a machine. That is, it is possible to, when a user receives notification from the external machine, reduce restriction of an action of the user, as compared with information terminals configured to be held by the users by hands.

Further, the garment is provided with the contact sensor and thus makes it possible to reduce, for example, a risk that the user forgets to wear a terminal device, as compared with wearable devices, such as wristwatches. Furthermore, the garment is provided with the contact sensor and the notification section and thus makes it possible to improve flexibility in positioning of the contact sensor and the notification section, as compared with, for example, small wearable devices.

A garment in accordance with Aspect 2 is configured, in Aspect 1, such that: the mutual capacitive contact sensor includes a plurality of units each configured to detect the input operation; a predetermined interval is provided between the plurality of units; and the information that is indicative of the input operation includes information specifying a unit which has detected the input operation, among the plurality of units.

In the garment in accordance with Aspect 2, a predetermined interval being provided between the respective units enables the user to, when performing an input operation for each of the unit, perform the input operation with large motion.

A garment in accordance with Aspect 3 is configured, in Aspect 1 or 2, such that the notification section executes the notification on a basis of a notification pattern specified by the instruction received by the receiving section.

In the garment in accordance with Aspect 3, the notification pattern executed by the notification section enables the user to recognize the contents of the notification from the external machine.

A garment in accordance with Aspect 4 is configured, in any one of Aspects 1 to 3, such that the notification section included in the garment includes a plurality of notification sections; and the instruction received by the receiving section includes information specifying the notification section that executes the notification, among the plurality of notification sections.

In the garment in accordance with Aspect 4, the user wearing the garment can recognize the contents of the notification from the external machine by recognizing which notification section has performed notification.

A notification system in accordance with Aspect 5 includes: a garment in accordance with any one of Aspects 1 to 4; and a management device which receives the information that is indicative of the input operation and that has been transmitted from the garment.

The notification system in accordance with Aspect 5 exerts an effect similar to that of Aspect 1.

A notification system in accordance with Aspect 6 is configured, in Aspect 5, such that the management device that instructs the notification section included in the garment execute the notification.

The notification system in accordance with Aspect 6 exerts an effect similar to that of Aspect 1.

Software Implementation Example

Functions of the garment 2a, the garment 2b, and the management device 3 can be realized by a program for causing a computer to function as the garments and the device, the program causing the computer to function as control blocks of the garments and the device.

In this case, the garments and the device include, as hardware for executing the program, a computer including at least one control device (e.g., a processor) and at least one storage device (e.g., a memory). The functions described in the above embodiments are realized by the program being executed by the at least one control device and the at least one storage device.

The program may be recorded in one or more non-transitory computer-readable recording media. The recording media may or may not be included in the garments and the device. In the latter case, the program may be supplied to or made available to the garments and the device via any wired or wireless transmission medium.

Furthermore, some or all of functions of the control blocks can also be realized by a logic circuit. For example, the present disclosure encompasses, in its scope, an integrated circuit in which a logic circuit that functions as each of the above-described control blocks is formed. In addition, the function of each of the control blocks can be realized by, for example, a quantum computer.

The processes described in the above embodiments may be carried out by artificial intelligence (AI). In this case, AI may be operated in the control device, or may be operated in another device (e.g., an edge computer or a cloud server).

The present disclosure is not limited to the embodiments above, but can be altered by a skilled person in the art within the scope of the claims. The present disclosure also encompasses, in its technical scope, any embodiment derived by combining technical means disclosed in differing embodiments as appropriate.

The invention claimed is:

1. A garment comprising:
a mutual capacitive contact sensor which has fibrous electric conductors and which detects an input operation performed by a user, the mutual capacitive contact sensor being attachable to the garment or being formable integrally with the garment;
a transceiver;
a notification section that is at least one of a mechanism configured to emit light, a speaker, and a vibrator;
a processor; and
a non-transitory computer readable recording medium storing a program, in accordance with the program, the processor:
transmitting, to an external machine, information that is indicative of the input operation which has been detected by the mutual capacitive contact sensor, through wired or wireless communication;
receiving a command based on the information transmitted to the external machine, from the external machine or another external machine, through wired or wireless communication; and
causing notification unit to execute notification according to the command which has been received,
wherein the garment is for a worker who works at a manufacturing line of a factory.

2. The garment according to claim 1, wherein:
the mutual capacitive contact sensor includes a plurality of units each configured to detect the input operation;
a predetermined interval is provided between the plurality of units; and
the information that is indicative of the input operation includes information specifying a unit which has detected the input operation, among the plurality of units.

3. The garment according to claim 1, wherein the notification section executes the notification on a basis of a notification pattern specified by the command received.

4. The garment according to claim 1, wherein:
the notification section included in the garment comprises a plurality of notification sections; and
the command received includes information specifying the notification section that executes the notification, among the plurality of notification sections.

5. A notification system comprising:
the garment according to claim 1; and
a management device which receives, through wired or wireless communication, the information that is indicative of the input operation and that has been transmitted from the garment.

6. The notification system according to claim 5, wherein the management device commands, through wired or wireless communication, that the notification section included in the garment execute the notification.

* * * * *